(12) United States Patent
Amann (10) Patent No.: US 12,059,765 B2
(45) Date of Patent: Aug. 13, 2024

(54) ASSEMBLY COMPRISING A TOOL AND PACKAGING

(71) Applicant: Amann Girrbach AG, Koblach (AT)

(72) Inventor: Jurgen Amann, Koblach (AT)

(73) Assignee: Amann Girrbach AG, Koblach (AT)

( * ) Notice: Subject to any disclaimer, the term of this patent is extended or adjusted under 35 U.S.C. 154(b) by 424 days.

(21) Appl. No.: 17/054,574

(22) PCT Filed: Apr. 5, 2019

(86) PCT No.: PCT/AT2019/000009
§ 371 (c)(1),
(2) Date: Nov. 11, 2020

(87) PCT Pub. No.: WO2019/213677
PCT Pub. Date: Nov. 14, 2019

(65) Prior Publication Data
US 2021/0086319 A1    Mar. 25, 2021

(30) Foreign Application Priority Data

May 11, 2018    (DE) .......................... 202018102658.5

(51) Int. Cl.
*B23Q 3/157*    (2006.01)
*B23Q 3/155*    (2006.01)
(Continued)

(52) U.S. Cl.
CPC ......... *B23Q 3/15526* (2013.01); *B65D 85/20* (2013.01); *B23Q 2003/15527* (2016.11);
(Continued)

(58) Field of Classification Search
CPC ............... Y10T 483/11; Y10T 483/115; Y10T 483/1809; Y10T 483/1864; B23Q 13/00;
(Continued)

(56) References Cited

U.S. PATENT DOCUMENTS 3,780,423 A     12/1973  Lillenthal et al.
4,413,731 A *   11/1983  Weideman ............. B65D 85/20
                                                206/583

(Continued)

FOREIGN PATENT DOCUMENTS

CN    102378848    3/2012
CN    104044014    9/2014
(Continued)

*Primary Examiner* — Erica E Cadugan
*Assistant Examiner* — Michael Vitale
(74) *Attorney, Agent, or Firm* — Volpe Koenig (57) ABSTRACT

An assembly including a tool (1) and packaging (2) for accommodating the tool (1). The tool (1) includes at least one machining head (3) for machining a workpiece (4), in particular a dental workpiece (4), by a machining unit (5), and a clamping portion (6) for securing the tool (1) in a chuck (7) of the machining unit (5) while the workpiece (4) is being machined. The tool (1) can be repeatedly removed from and placed back in the packaging (2), with the packaging (2) being provided with at least one securing device (11) for fastening the packaging (2) in a temporary tool magazine (12) of the machining unit (5).

10 Claims, 5 Drawing Sheets

(51) Int. Cl.
  *B23Q 13/00* (2006.01)
  *B65D 85/20* (2006.01)
  *A61C 13/00* (2006.01)

(52) U.S. Cl.
  CPC .............. *B23Q 2003/15532* (2016.11); *B23Q 3/15539* (2016.11); *B23Q 3/15722* (2016.11); *B23Q 13/00* (2013.01); *Y10T 483/11* (2015.01); *Y10T 483/115* (2015.01); *Y10T 483/1795* (2015.01); *Y10T 483/1809* (2015.01); *Y10T 483/1845* (2015.01); *Y10T 483/1864* (2015.01); *Y10T 483/1882* (2015.01)

(58) Field of Classification Search
  CPC ........... B23Q 2003/15527; B23Q 2003/15532; B65D 85/20
  USPC ............................................ 483/2, 3, 59, 65
  See application file for complete search history.

(56) References Cited

U.S. PATENT DOCUMENTS

| | | | | |
|---|---|---|---|---|
| 4,858,302 | A | | 8/1989 | Stribiak |
| 4,995,513 | A | * | 2/1991 | Rosler ................ B65D 43/0256 220/837 |
| 5,595,294 | A | * | 1/1997 | McKenzie ......... B65D 21/0202 206/349 |
| 5,846,036 | A | * | 12/1998 | Mizoguchi ............ B23Q 13/00 279/157 |
| 8,302,772 | B2 | * | 11/2012 | Chang .................... B65D 25/22 206/379 |
| 9,265,592 | B2 | | 2/2016 | Koch |
| 9,724,794 | B1 | * | 8/2017 | Foster .................... B23Q 13/00 |
| 2003/0093103 | A1 | | 5/2003 | Malackowski et al. |
| 2004/0135692 | A1 | | 7/2004 | Below et al. |
| 2010/0248177 | A1 | | 9/2010 | Mangelberger et al. |
| 2011/0192746 | A1 | * | 8/2011 | Chang .................... B65D 25/22 206/379 |
| 2012/0234709 | A1 | * | 9/2012 | Chang .................... B65D 25/10 206/349 |
| 2020/0230761 | A1 | * | 7/2020 | Shirone ................ B23Q 7/1436 |

FOREIGN PATENT DOCUMENTS

| | | | | |
|---|---|---|---|---|
| CN | 104249178 | A * | 12/2014 | ............ B23Q 13/00 |
| CN | 105069912 | | 11/2015 | |
| CN | 105583671 | | 5/2016 | |
| DE | 2135240 | | 1/1972 | |
| DE | 19806217 | A1 * | 8/1999 | ............ B65D 25/10 |
| DE | 10260706 | | 7/2004 | |
| DE | 202005002005 | U1 * | 6/2005 | ............ B23Q 13/00 |
| DE | 102005013617 | | 9/2006 | |
| DE | 102005058881 | | 6/2007 | |
| DE | 112005003148 | | 10/2007 | |
| DE | 102006057338 | | 6/2008 | |
| DE | 102007005515 | B3 * | 8/2008 | .......... B65D 25/101 |
| DE | 102013206166 | | 10/2014 | |
| DE | 112014004191 | | 5/2016 | |
| DE | 202015008056 | | 4/2017 | |
| EP | 0522498 | | 1/1993 | |
| EP | 0541020 | | 5/1993 | |
| EP | 1099511 | | 5/2001 | |
| EP | 2683322 | | 3/2016 | |
| EP | 2233103 | | 11/2017 | |
| EP | 3372338 | | 9/2018 | |
| JP | S62201636 | | 12/1987 | |
| JP | 1500738 | | 3/1989 | |
| JP | H03010734 | | 1/1991 | |
| JP | 5253780 | | 10/1993 | |
| JP | H0636737 | | 5/1994 | |
| KR | 101488256 | | 1/2015 | |
| WO | 8706167 | | 10/1987 | |
| WO | 2006066259 | | 6/2006 | |

* cited by examiner

ASSEMBLY COMPRISING A TOOL AND PACKAGING

TECHNICAL FIELD

The present invention relates to an assembly comprising a tool and a packaging for holding the tool, wherein the tool comprises at least one machining head for the material-removing machining of a workpiece, in particular a dental workpiece, by a machining unit, and a clamping portion for securing the tool in a chuck of the machining unit during the material-removing machining of the workpiece, and wherein the tool can repeatedly be removed from the packaging and arranged in the packaging again.

BACKGROUND

In the prior art, it is known to machine workpieces, and in particular dental workpieces, with removal of material by machining units in order thus to produce corresponding products, in particular dental products, or intermediate products thereof by material-removing machining of the workpiece. For this purpose, tools which comprise a machining head are clamped with their clamping portion into the machining unit in order thus to be able to machine the workpiece with removal of material by the tool, or the machining head thereof. For this purpose, the clamping portion is secured in a chuck of the machining unit. By means of the chuck, the tool is held during the material-removing machining and generally rotated about a longitudinal axis. The chuck with the tool, on the one hand, and the workpiece, on the other hand, can thereby be moved relative to one another in a manner known per se. All this is shown, for example, in EP 2 683 322 B1. The tools, which can be, for example, milling tools, drills or grinders, are marketed packed in a packaging and must then generally be inserted by hand into an intermediate tool storage station of the machining unit. The required tool can then be removed from the intermediate tool storage station and clamped into the chuck, in order then to machine the workpiece with removal of material by the tool clamped in the chuck.

In the prior art, the sorting of new tools into the intermediate tool storage station by hand is on the one hand laborious and on the other hand can also lead to errors. If a tool is arranged at the incorrect position in an intermediate tool storage station, it may happen that the incorrect tool for the particular intended machining operation is clamped into the chuck.

SUMMARY

The object of the invention is to propose an improvement here, which simplifies at least the insertion of new tools into the intermediate tool storage station.

To that end, it is provided in an assembly of the type mentioned above that the packaging has at least one securing device for fixing the packaging in an intermediate tool storage station of the machining unit.

In other words, in the invention the tools are thus no longer first removed from the sales packaging and then inserted individually into the intermediate tool storage station. Instead, it is provided in the invention that the tool in question, together with the packaging, is inserted by the securing device of the packaging into the intermediate tool storage station of the machining unit and fixed in the intermediate tool storage station. The tool is then held in the intermediate tool storage station of the machining unit by the packaging, or in other words with the interposition of the packaging.

A corresponding method can accordingly provide, in the case of a corresponding assembly, that the packaging is fixed in the intermediate tool storage station of the machining unit by its at least one securing device. The tool in question is then arranged in the intermediate tool storage station of the machining unit with the interposition of the packaging.

BRIEF DESCRIPTION OF THE DRAWINGS

Preferred features of the invention will be explained by way of example in the course of the following description of the figures. In the figures.

DETAILED DESCRIPTION

Figure 1:
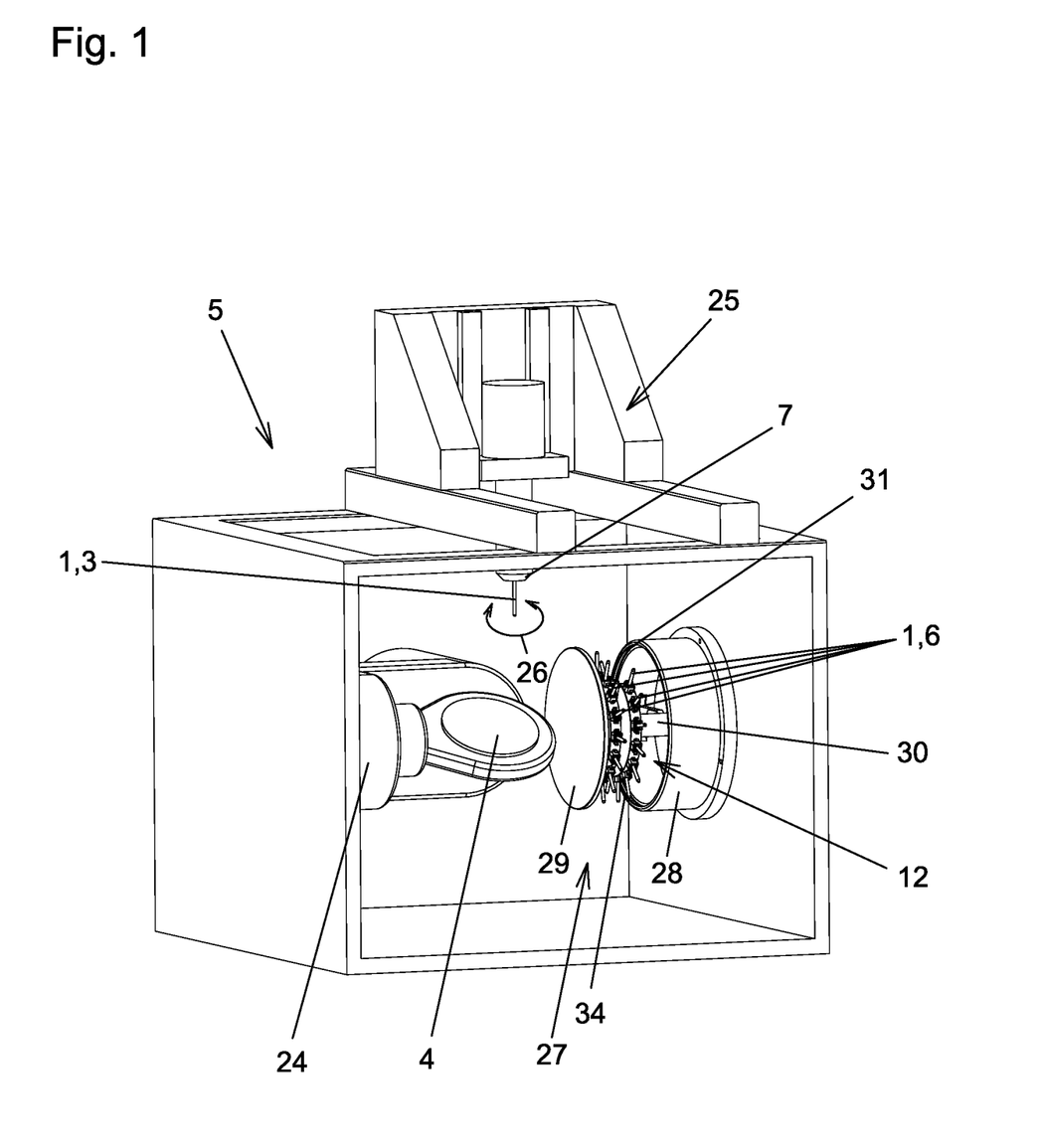
FIG. 1 shows a machining unit, represented schematically, for the material-removing machining of a workpiece, in particular a dental workpiece, having an intermediate tool storage station in which a plurality of tools are fixed by their respective packaging.

FIG. 1 shows, in a schematic representation, an assembly according to the invention in which the assembly comprises a plurality of tools 1 and packagings 2, wherein the packagings 2 are fixed by their securing devices 11 in an intermediate tool storage station 12 of the machining unit 5. The intermediate tool storage station 12 and also the machining unit 5 can thereby also be seen as part of the assembly. The machining unit 5 can be, for example, a generally computer-controlled CAD/CAM machine which, apart from the innovations according to the invention, is known per se and by which the workpieces 4 to be machined can be machined with removal of material, that is to say, for example, by drilling, milling or grinding. The computer-assisted control of such machining units is known per se and does not require further explanation here. In the exemplary embodiment shown here, the workpiece 4 is arranged on a carrier arm 24 in a machining chamber 27 of the machining unit 5 in such a manner that it is movable and pivotable in multiple spatial directions. For machining of the workpiece 4, a tool 1, as is known per se, is secured by its clamping portion 6 in the chuck 7 of the machining unit 5, so that the workpiece 4 can be machined with removal of material by the machining head 3 of that tool 1. The machining head 3 of the tool 1 can be, for example, a grinding head or also a drilling head or a milling head. The tool 1 and in particular its machining head 3 can of course be of very different forms. This is known per se in the prior art and does not require further explanation here. For the material-removing machining, the tool 1 clamped in the chuck 7 is in any case rotated in one of the directions 26 in the example shown here. By the spindle drive 25, which also ensures this rotation, the chuck 7 with the tool 1 secured therein can be moved relative to the workpiece 4 preferably in all three spatial directions and optionally also in other degrees of freedom. Due to the corresponding degrees of freedom of the carrier arm 24 on the one hand and of the chuck 7 on the other hand, very different machining angles can be achieved on the workpiece 4. This is also known per se and does not require further explanation. The chuck 7 is in any case the part of the machining unit 5 in which the particular tool 1 currently required for the material-removing machining of the workpiece 4 is held during the material-removing machining. The tool 1 is generally also correspondingly driven via the chuck 7.

The tools 1 that are not required for the machining step that is to be performed at the present time are located during that step in the intermediate tool storage station 12, which in the exemplary embodiment shown here is likewise located within the machining chamber 27 of the machining unit 5. According to the invention, as will be explained and shown in detail hereinbelow, the packagings 2 of a particular tool 1 each have at least one securing device 11 for fixing the packaging 2 in question in the intermediate tool storage station 12 of the machining unit 5. There can be seen in FIG. 1 in each case the freely protruding clamping portion 6 of the tool 1 in question and the packagings 2 arranged in the intermediate tool storage station 12, by which packagings the tools 1 that are not currently required for the machining step are intermediately stored in the intermediate tool storage station 12.

In the exemplary embodiment shown, the intermediate tool storage station 12 has, in addition to the holders for the packagings 2 with the tools 1 in the packaging holder 34, also a storage station wall 28 and a storage station cover 29. In the closed state, not shown here, the storage station cover 29 lies against the storage station wall 28, preferably with the interposition of a seal 31, in such a manner that there is formed in the interior enclosed jointly by the storage station wall 28 and by the storage station cover 29 a storage space which is sufficiently sealed with respect to the remainder of the machining chamber 27 and in which the tools 1 that are not currently required, together with their packagings 2, are protected from moisture, dust and the like. The storage station cover 29 is preferably brought into the open position shown in FIG. 1 only when a tool change 1 is intended, that is to say when a tool 1 that has hitherto been used is sorted back into its packaging 2 and thus back into the intermediate tool storage station 12 and a new tool 1 is removed from the intermediate tool storage station 12 and from its packaging 2 and clamped into the chuck 7 by its clamping portion 6. In addition, in the open position, it is of course also possible for new tools 1, together with their packaging, to be introduced into the intermediate tool storage station 12 or for old tools 1, together with their packaging, to be removed from the intermediate tool storage station 12. The insertion and also the removal of the tool 1 from the packaging 2 in question and thus from the intermediate tool storage station 12 advantageously takes place fully automatically by corresponding movement of the chuck 7 by the spindle drive 25. The packaging 2 is so designed and permanently so stable that the tool 1 can repeatedly be removed from the packaging 2 and inserted into the packaging again, or arranged in the packaging again.

For opening and closing the storage station cover 29, the storage station cover, in the exemplary embodiment shown here, together with the packaging holder 34 of the intermediate tool storage station 12, in which the packagings 2, together with the tools 1, are secured, is displaceably mounted on a storage station pin 30. By retracting or extending the storage station pin 30, the intermediate tool storage station 12 can thus be opened and closed.

Preferred variants provide that the storage station cover 29, together with the packaging holders 34, can be taken off the storage station pin 30. This simplifies, for example, the removal of old tools 1, together with their packagings 2, from the intermediate tool storage station 12, or the packaging holders 34, which here are of annular shape, of the intermediate tool storage station 12, in order thus to be able to secure new tools 1 by their packagings 2 and the securing devices 11 thereof in the packaging holders 34, or in the intermediate tool storage station 12. It is also conceivable thus to exchange entire packaging holders 34, together with the packagings 2 and tools 1 arranged therein. It is, for example, conceivable to equip corresponding packaging holders 34 with corresponding tools 1 arranged in their packagings 2 which are required for a specific material type of a workpiece 4, in order thus to be able to introduce an entire set of new tools 1 into the intermediate tool storage station 12 in a simple manner when a different material, or a different workpiece 4, is to be machined.

Figure 3:
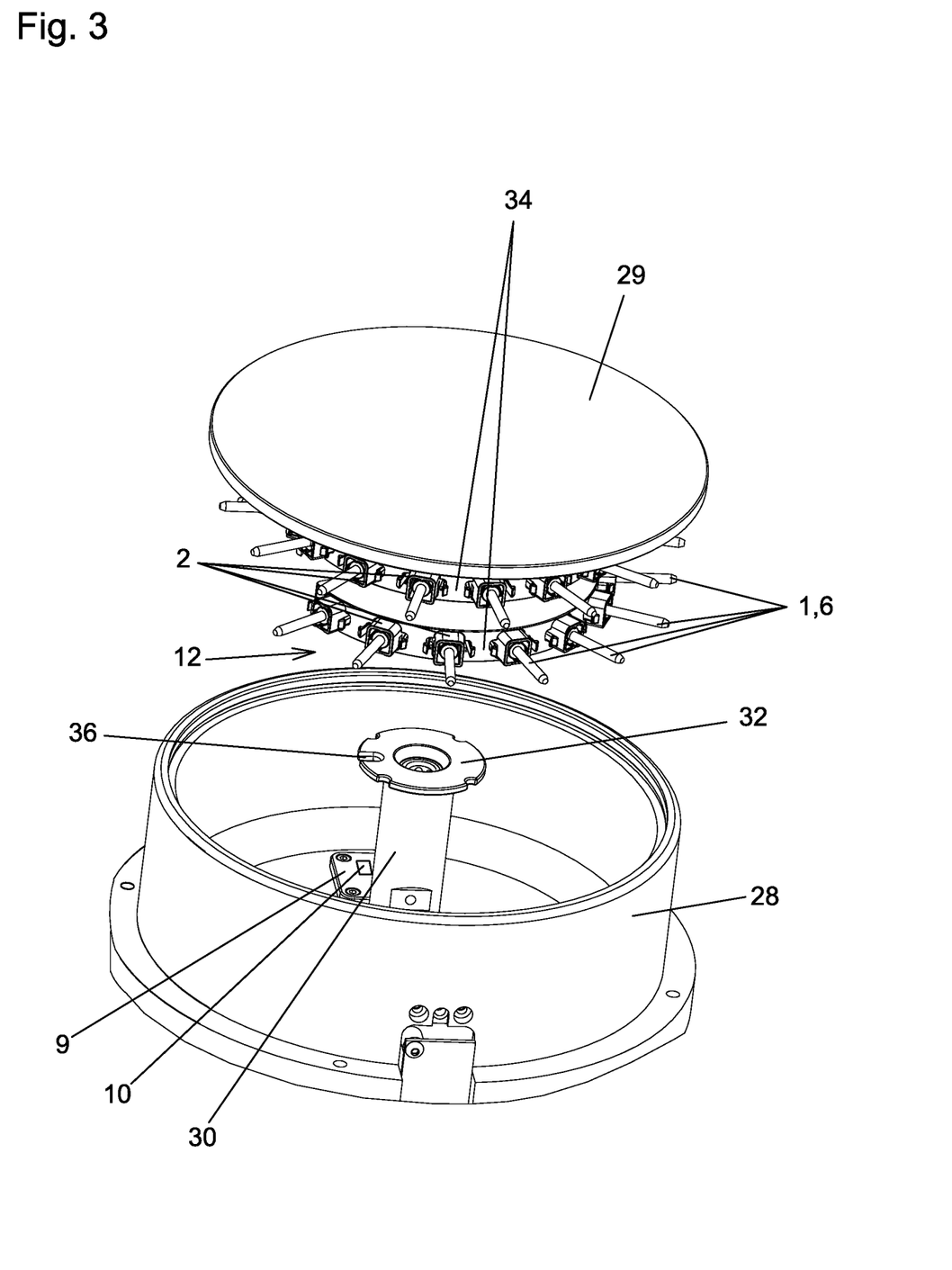
FIGS. 3 and 4 show parts of the intermediate tool storage station in an arrangement separated from one another.
Figure 4:
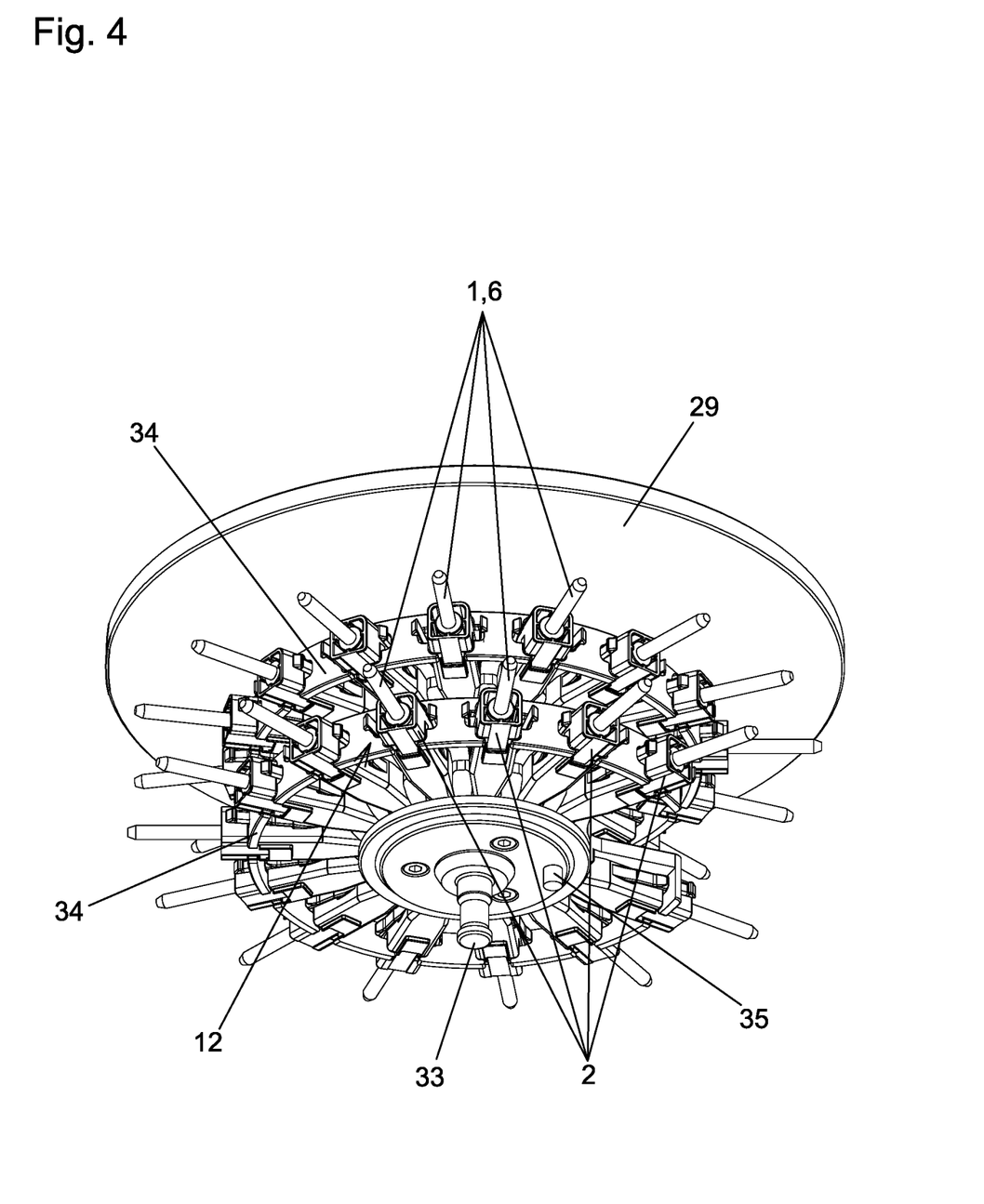

For releasable securing, there is arranged, as can be seen particularly clearly in FIGS. 3 and 4, on the storage station pin 30 in the exemplary embodiment shown here an adapter 32 which forms a releasable connection. The corresponding adapter counter-piece 33, which can be connected to the adapter 32, is correspondingly located on the packaging holders 34, or on the storage station cover 29, so that simple removal and optionally also exchange of the storage station cover 29, together with the packaging holders 34, is possible. The index pin 35, in conjunction with the index pin receiver 36 therefor, ensures that the packaging holders 34 of the intermediate tool storage station 12, together with the storage station cover 29, can be secured to the storage station pin 30 in only a defined position.

Figure 5:
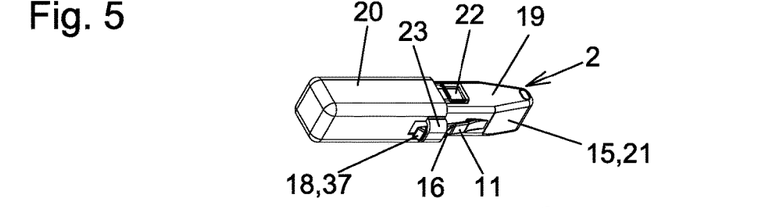
FIGS. 5 to 8 show representations relating to the exemplary embodiment used here of an assembly according to the invention.
Figure 6:
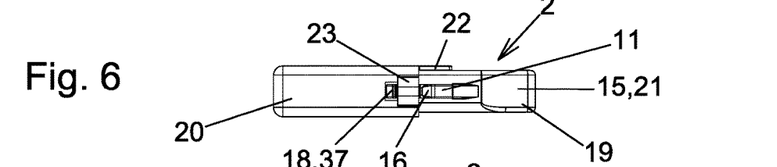
Figure 7:
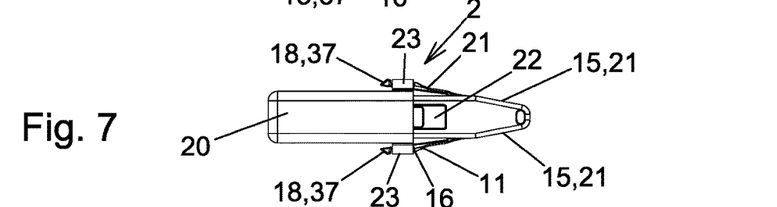
Figure 8:
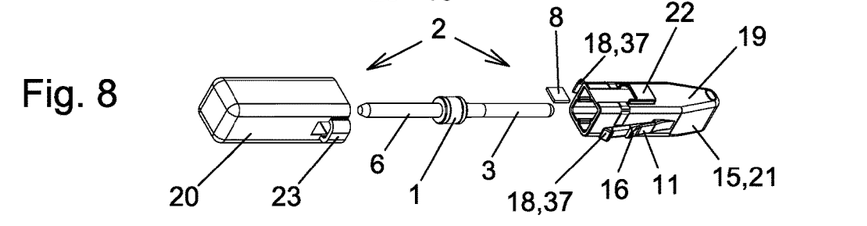

FIGS. 5 to 8 show an embodiment according to the invention of an assembly comprising a tool 1 and a packaging 2 for holding the tool 1. FIG. 5 is a perspective view. FIGS. 6 and 7 are each side views rotated through 90° relative to one another. FIG. 8 is an exploded view. In FIGS. 5 to 7, the packaging 2 is closed, and in the exploded view according to FIG. 8 it is shown correspondingly opened.

Figure 9:
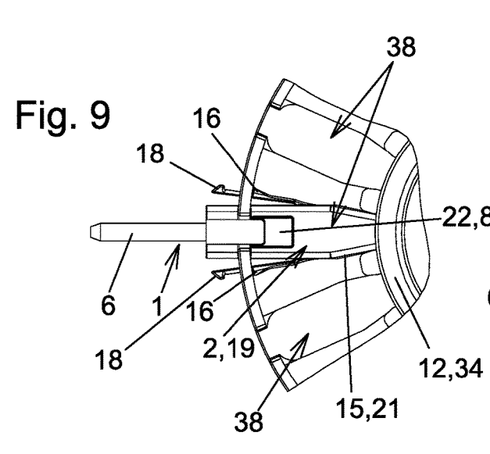
FIGS. 9 and 10 show representations relating to the fixing of the packaging, together with the tool, in the intermediate tool storage station.
Figure 10:
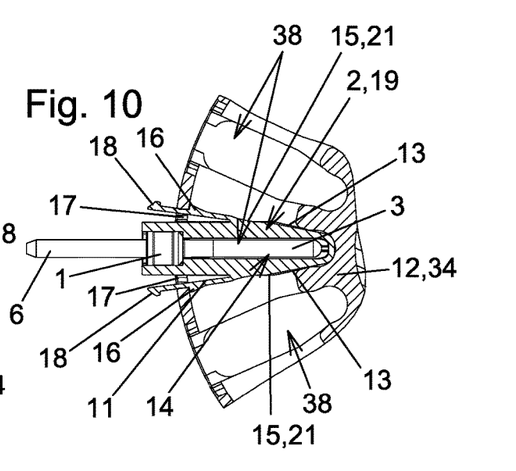

In FIG. 9, the packaging 2, or here the base body 19 thereof, including the tool 1 arranged in the packaging 2, is arranged in a corresponding holder of the packaging holder 34 and thus of the intermediate tool storage station 12 and fixed by the securing device 11. Fixed here means, in the sense of releasably fixed, that the packaging 2 is held by the securing device(s) 11 stably and permanently in the packaging holder 34 or, generally speaking, in the intermediate tool storage station 12 in such a manner that the tool 1 can, simply and without problems, repeatedly be removed from the packaging 2, or here the base body 19 thereof, and arranged in the packaging again, while the packaging 2 remains in the packaging holder 34 or, generally speaking, in the intermediate tool storage station 12. However, fixed preferably does not mean that the packaging 2 can no longer be removed from the packaging holder 34, or the intermediate tool storage station 12, at all. The exchange, already outlined above, of tools 1, together with their packagings 2, in the intermediate tool storage station 12 preferably remains possible. FIG. 10 shows a section through the packaging holder 34, the packaging 2 and the workpiece 1.

The tool 1 can, as has already been explained, repeatedly be removed from the packaging 2 and arranged in the packaging again. In other words, the packaging 2 is thus so designed that the tool 1 can be removed from the packaging and introduced into the packaging again repeatedly, or many times. In particularly preferred variants, the packaging 2 according to the invention is a sales packaging in which the tool 1 is sold. It can accordingly be provided in the invention that the tool 1 can be marketed with a packaging 2 with which it can then also immediately be secured in the intermediate tool storage station 12 of the machining unit 5. In these embodiments, the packaging 2 is accordingly on the one hand a sales packaging in which tools 1 are sold on the market but on the other hand also a securing means for securing a tool 1 that is currently not required in the intermediate tool storage station 12 of the machining unit 5.

Although this does not necessarily have to be the case, preferred variants provide that the packaging 2 has a single holding space 14 delimited by at least one holding space wall 13 of the packaging 2, wherein the tool 1 can be arranged as a single tool 1 in the holding space 14. In other words, it is accordingly preferably provided that precisely one single tool 1, that is to say not two, three or more tools 1, can be arranged in a packaging 2. However, it is of course possible to deviate from this in other embodiment variants. It is preferably provided that the tool 1 is arranged with its machining head 3 in the holding space 14 of the packaging 2. In the exemplary embodiment shown, the packaging 2 is formed of a base body 19 and a cover part 20 which can be releasably secured thereto, and accordingly is in two parts. The holding space 14 is preferably located in the base body 19, so that the machining head 3 of the tool 1 can be inserted into the base body 19. In the embodiments shown, and also in other preferred embodiments, it can be provided that the clamping portion 6, which serves to secure the tool 1 in the chuck 7, protrudes beyond the base body 19 when the tool 1 is inserted with its machining head 3 in the holding space 14. It can then be provided, as is also implemented here, that the cover part 20, when sold, encloses the clamping portion 6 of the tool 1, so that the tool 1, for marketing, is received completely in the packaging 2 and is enclosed thereby. This has the advantage that the tool 1 is better protected while it is being marketed and sold. The at least one securing device 11 can, as is also implemented here, be arranged on the outside wall 15 of the packaging 2, preferably of the base body 19 of the packaging 2. The securing device 11 can thereby be all that permits corresponding, preferably releasable, fixing of the packaging 2 in the intermediate tool storage station 12. The securing device(s) 11 can in principle be, for example, all possible suitable interlocking and/or force-based and/or friction-based means for securing. Examples are screw connections, clamped connections and the like. Preferably, the securing device(s) 11 face outwards or protrude outwards from the outside wall 15 of the packaging 2 or, preferably, of its base body 19. In preferred embodiments, the securing devices 11 with which the packaging 2 in question can be fixed in the intermediate tool storage station 12 of the machining unit 5 are part of a latching connection. Accordingly, as is also shown here, the securing device 11 of the packaging 2 can have at least one latching projection for forming a latching connection with the intermediate tool storage station 12 of the machining unit 5. In FIG. 10, the two securing devices 11 provided here in the example shown for each packaging 2 are secured with their respective latching projections 16 in a corresponding latching projection receiver 17 of the intermediate tool storage station 12, or here specifically of the packaging holder 34 of the intermediate tool storage station 12, in such a manner that a latching connection is formed. The latching projections of the securing device 11 are preferably, as is also implemented here, secured, preferably molded on, in an elastically resilient manner to the packaging 2, preferably to the base body 19 and particularly preferably to the outside wall 15 thereof. Of course, an alternative would also be that the respective securing device 11 has at least one latching projection receiver 17 for forming a latching connection with the intermediate tool storage station 12. In this case, the corresponding latching projections 16 could be formed on the intermediate tool storage station 12, or on the packaging holder 34 thereof.

In preferred embodiments such as that shown here, the packaging 2 has an actuating element 18 for releasing the securing device 11. Preferably, the actuating element 18 is so configured that the securing device 11 can be released by hand, that is to say without the need for a tool. It is particularly preferably provided, as is also implemented here, that the actuating element 18 and the latching projection 16, or optionally the other way round also the latching projection receiver 17, are secured as a spring-mounted lever, or a spring tongue, to the packaging 2, preferably to the outside wall 15 thereof and most particularly preferably to the outside wall 15 of the base body 19. A correspondingly lengthened region of that lever, or of that spring tongue, can then also be configured, as implemented here, as an actuating element 18 for releasing the securing means 11.

It is particularly advantageous that the securing device 11 is configured not only for fixing the packaging 2 in the intermediate tool storage station 12 but additionally also for fixing the cover part 20 to the base body 19. This is also so implemented in the exemplary embodiment shown here and can be seen particularly clearly in FIGS. 5 to 7. As shown here, it is, for example, possible in this respect that the actuating element 18 is configured as an additional latching projection 37, or an additional latching projection is formed on the securing device 11, which serves for releasably connecting the cover part 20 to the base body 19 and thus for releasably fixing the cover part 20 to the base body 19. Preferably, a securing means 23 configured as a tab on the cover part 20 is located on the cover part 20 for this purpose. The securing device 11 can then engage into this securing means 23, as here, for example, specifically with the additional latching projection 37, in order thus to fix the cover part 20 to the base body 19, in particular during sale or marketing. Of course, this dual function of the securing device 11 can also be configured differently than specifically shown here, on the one hand for fixing the packaging 2 in the intermediate tool storage station 12 and on the other hand for securing the cover part 20 to the base body 19.

As already indicated, FIGS. 9 and 10 show, by way of example, an assembly comprising a packaging 2 and a tool 1 arranged therein, and an intermediate tool storage station 12, or the packaging holder 34 thereof, of the machining unit 5, wherein the tool 1 is held in the packaging, here specifically in the base body 19 of the packaging 2, and the packaging 2, again preferably the base body 19 of the packaging 2, is fixed by the securing device(s) 11 in the intermediate tool storage station 12 of the machining unit 5. Preferably, as is already apparent from the figures discussed hitherto, a plurality of slots 38 are provided in the packaging holder 34, or in the intermediate tool storage station 12, so that a plurality of tools 1 with their respective packaging 2 can be fixed in the intermediate tool storage station 12.

Advantageously, it is provided that the packaging 2 in question can be secured in the intermediate tool storage station 12, or in one of the slots 28 of the packaging holder 34, in only a single defined orientation. For this purpose, preferred variants provide that that packaging 2, preferably the base body 19 of the packaging 2, has an outer contour 21 which permits only a single orientation of the packaging 2 when the packaging 2 is arranged in the intermediate tool storage station 12.

Particularly preferred variants of assemblies according to the invention provide that the packaging has a data memory 8. This data memory 8 is preferably repeatedly machine readable and repeatedly machine writable. Preferably, it is an electronic data memory 8. It is thereby possible to store on the data memory 8 of the packaging 2 specific and individual data for the particular tool 1 arranged in the packaging 2. This can be used for identifying the tool 1. It is, however, especially possible in this manner, generally speaking, with a corresponding configuration, to store the history of each individual tool 1 and read it out again if required. For this purpose, the data memory 8 is preferably repeatedly machine readable and also machine writable. Accordingly, it is preferably not only a data memory 8 which can be written only once, for example with a serial number or the like, in which the stored data can then no longer be changed, but a data memory 8 on which new data can be stored at any time, in order to be read out later. Particularly preferably, the data memory 8 of the packaging 2 is a transponder or part of a transponder. Corresponding transponders are also referred to in the prior art as tags. They could also be referred to as a chip. A transponder is the combination of a transmitter and a responder. Particularly preferably it is a passive transponder, which does not have its own power supply but is fed with energy solely from the field of another transmitting and receiving unit. Particularly preferably, the transponder is a RFID (radio frequency identification) known per se. Specific information for the tool 1 in question can be stored in the data memory 8 of the packaging 2. This can be, for example, information relating to the identity of the tool 1. It can thus be a type designation, a serial number or the like. However, it is especially possible to store on the data memory 8 preferably information about the wear status of the tool 1 in question and/or information about its previous uses and/or information about its previous frequency of use. Accordingly, it is also possible, for example, to store on the data memory 8 how long the tool has already been in operation and for what purpose it was used.

The data memory 8, or transponder, or chip, can be secured to and/or integrated into the packaging 2 in many different ways. For example, incorporation, casting-in, adhesive bonding and the like are conceivable. In the variant shown, the data memory 8, or transponder, is held, for example, in a pocket-like data memory holder 22 of the packaging 2, or here specifically of the base body 19.

Figure 2:
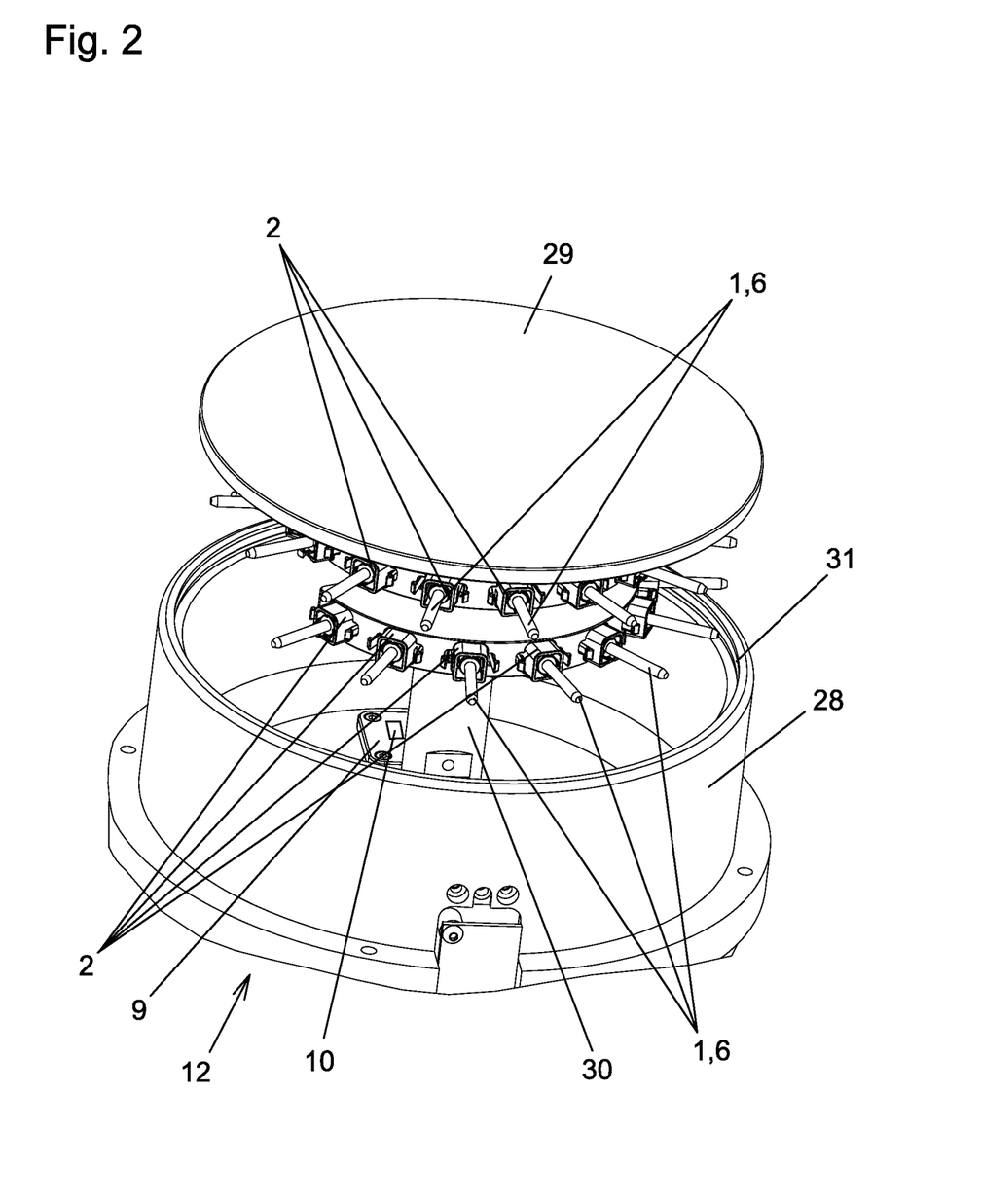
FIG. 2 shows the intermediate tool storage station according to FIG. 1 on an enlarged scale.

In order to be able to read and also re-write the data memory 8 of the packaging 2 of the tool 1 in question, preferred variants provide that the machining unit 5, preferably the intermediate tool storage station 12 thereof, has a reader for reading data from the data memory 8 of the packaging 2 or preferably a reader and writer 9 for reading data from the data memory 8 of the packaging 2 and for writing data to the data memory 8 of the packaging 2. In the case of the reader and writer 9, it is then possible both to read data from the data memory 8 of the packaging 2 in question and to store data on the data memory 8 of the packaging 2 in question. It is preferably provided that the machining unit 5 additionally has a data memory 10, preferably an electronic data memory, which is repeatedly machine readable and repeatedly machine writable. In the exemplary embodiment shown here in the figures, this reader and writer 9 is integrated into the intermediate tool storage station 12, as can be seen particularly clearly in FIG. 2. The data memory 10 can likewise be integrated into this reader and writer 9, as is shown schematically in FIG. 2.

In this configuration, the mentioned specific data for the tool 1 arranged in the packaging 2 in question can both be stored on the data memory 8 of the packaging 2 and read therefrom and be stored on the data memory 10 of the machining unit 5 and read therefrom again. In this connection, there can accordingly be provided a method for operating a corresponding assembly which is characterized in that, by the reader and writer 9 of the machining unit 5, data are read from the data memory 8 of the packaging 2 of the tool 1 and/or written to the data memory 8 of the packaging 2 of the tool 1 and/or data are read from the data memory 10 of the machining unit 5 and/or data are written to the data memory 10 of the machining unit 5. For a pure reader, data is in each case correspondingly only read from the data memory 8 and/or 10.

It can be provided that the data are read from the data memory 8 of the packaging 2 in the course of securing the tool 1 in the chuck 7 of the machining unit 5. In the course of securing can be before, preferably shortly before, securing, during securing but also after, preferably shortly after, securing the tool 1 in the chuck 7. On the other hand, it is then of course also possible that the data are written to the data memory 8 of the packaging 2 and/or to the data memory 10 of the machining unit 5 in the course of the re-arrangement of the tool 1 in the packaging 2. As a result, after the tool 1 in question has been used, those corresponding data are correspondingly updated in the data memory 8 of the packaging 2 in question, so that, when they are next called up, the individual and correspondingly updated history of the tool 1 in question is available. By storing the corresponding information about the individual tool 1 in the data memory 8 of the packaging 2 and/or in the data memory 10 of the machining unit 5, it is also no longer necessary to provide a fixed slot for a particular tool 1 in the intermediate tool storage station 12, since the position of the tool 1 in question can be stored in the mentioned data memories 8 and/or 10 and accordingly retrieved at any time.

Finally, it is also pointed out that many different workpieces 4 can be machined with removal of material using the tools 1 of assemblies according to the invention. However, the workpieces 4 are particularly preferably dental workpieces 4, that is to say workpieces 4 from which dental products such as, for example, bridges, full and/or partial dentures, artificial teeth or the like can be produced.

LEGEND TO THE REFERENCE NUMERALS

1 tool
2 packaging
3 machining head
4 workpiece
5 machining unit
6 clamping portion
7 chuck
8 data memory
9 reader and writer
10 data memory
11 securing device
12 intermediate tool storage station
13 holding space wall
14 holding space
15 outside wall
16 latching projection
17 latching projection receiver
18 actuating element 19 base body
20 cover part
21 outer contour
22 data memory holder
23 securing means
24 carrier arm
25 spindle drive
26 rotation
27 machining chamber
28 storage station wall
29 storage station cover
30 storage station pin
31 seal
32 adapter
33 adapter counter-piece
34 packaging holder
35 index pin
36 index pin receiver
37 additional latching projection
38 slot

The invention claimed is:

1. An assembly comprising:

a tool;

a packaging for holding the tool;

the tool comprises at least one machining head adapted for a material-removing machining of a workpiece by a machining unit, and further comprises an end portion that is disposed at an opposite end of the tool as the at least one machining head, wherein the end portion is adapted for securing the tool in a chuck of the machining unit during the material-removing machining of the workpiece; and the tool is configured to be repeatedly removed from the packaging and arranged in the packaging again, wherein the packaging has a base body which holds the tool and the packaging has a cover part;

wherein, with the cover part removed from the base body, the at least one machining head is received and held in the base body;

wherein, with the cover part removed from the base body, the base body has at least one securing device that is configured to fix the base body of the packaging in a tool storage station of the machining unit; and wherein the packaging further has an actuating element for releasing the at least one securing device.

2. The assembly as claimed in claim 1, wherein the packaging is a sales packaging in which the tool is adapted to be sold.

3. The assembly as claimed in claim 1, wherein the packaging has a single holding space delimited by at least one holding space wall of the packaging, and the tool is adapted to be arranged as a single tool in the holding space.

4. The assembly as claimed in claim 1, wherein the at least one securing device is arranged on an outside wall of the packaging.

5. The assembly as claimed in claim 1, wherein the at least one securing device has at least one latching projection configured for forming a latching connection with the tool storage station of the machining unit.

6. The assembly as claimed in claim 1, further comprising the tool storage station of the machining unit, wherein the tool is held in the packaging, and the packaging is fixed in the tool storage station of the machining unit by the at least one securing device.

7. The assembly as claimed in claim 6, wherein the packaging has an outer contour which permits only a single orientation of the packaging when the packaging is arranged in the tool storage station.

8. The assembly as claimed in claim 7, wherein the outer contour is on the base body of the packaging.

9. The assembly as claimed in claim 1, wherein the base body holds the machining head of the tool and the end portion of the tool freely protrudes beyond the base body with the tool placed as far as possible in a longitudinal direction of the tool into the base body.

10. The assembly as claimed in claim 1, wherein the at least one securing device is additionally configured for fixing the cover part to the base body.

* * * * *